United States Patent [19]

Quaeck

[11] Patent Number: 5,799,778
[45] Date of Patent: Sep. 1, 1998

[54] DRIVE SYSTEM FOR RECIPROCATING CONVEYORS

[76] Inventor: Manfred W. Quaeck, 1515-210th Ave. NW., Redmond, Wash. 98053

[21] Appl. No.: 710,578

[22] Filed: Sep. 19, 1996

[51] Int. Cl.$^6$ ................................................ B65G 25/00
[52] U.S. Cl. ................................................ 198/750.5
[58] Field of Search ..................... 198/750.2, 750.5, 198/750.7

[56] References Cited

U.S. PATENT DOCUMENTS

| | | | |
|---|---|---|---|
| 5,427,229 | 6/1995 | Foster | 198/750.7 |
| 5,522,494 | 6/1996 | Lutz | 198/750.5 X |

*Primary Examiner*—James R. Bidwell
*Attorney, Agent, or Firm*—Robert W. Jenny

[57] ABSTRACT

The subject invention is for use in reciprocating conveyors in which the load is carried and moved by groups of side-by-side slats which reciprocate longitudinally. The slats in each group are attached to a drive member and the drive members are actuated by the subject system to move the groups of slats in unison in one direction and sequentially in the other. The system includes a linear, double acting hydraulic actuator for each group and connected to the drive member for that group. The actuators have equal strokes, different piston areas and are connected in parallel to the hydraulic power supply. The actuators and drive members are arranged such that for motion in one direction the actuator having the largest piston area and its drive member cannot move until the other actuator(s) and drive(s) can move and thus they move in unison in that direction. For motion in the other direction the actuator with the largest piston area can move independently and moves first because as the fluid pressure increases it is the first to develop enough force to move the group of slats it actuates. As pressure increases, actuator(s) with lesser piston areas sequentially develop enough force to move the groups of slats to which they are connected. The actuators are controlled by one two position four way valve which is operated in coordination with the actuator having the least piston area. Coordination can be mechanical, electrical, hydraulic or pneumatic.

1 Claim, 1 Drawing Sheet

DRIVE SYSTEM FOR RECIPROCATING CONVEYORS

BACKGROUND OF THE INVENTION

1. Field

The subject invention is in the field of conveyors which can be used on trucks and trailers and particularly conveyors known as reciprocating floor conveyors. Such conveyors comprise pluralities of slats which are moved longitudinally in ways which cause loads carried by the conveyor to move longitudinally along and onto or off of the conveyor. The subject invention is specifically in the field of systems and mechanisms for activating the slats of such conveyors, more specifically hydraulic systems.

2. Prior Art

The patents listed below are a sampling of prior art in this more specific field considered to be closest prior art to the subject invention.

| | |
|---|---|
| 3,905,290 | 4,793,469 |
| 4,143,760 | 5,096,356 |
| 4,580,678 | 5,222,590 |
| 4,793,468 | 5,310,044 |

The simpler of the hydraulic systems in these prior art conveyors comprise actuators, direction valves and flow regulators and more complex systems also include timing cylinders, switching valves, two-way three port or two-way four port valves, one for each actuator, relief valves, reversing valves, vent valves and check valves.

Experience has shown that performance of such conveyors is not necessarily improved with complexity of the system, that first, maintenance and operational costs tend to increase with increasing complexity and that reliability tends to decrease with increasing complexity. Accordingly, the primary objective of the subject invention is to provide, for reciprocating conveyors, a drive system which is simpler than prior art systems and therefore less expensive and more reliable than prior art systems with no sacrifices in performances. Another objective is that the subject system be readily usable in a wide variety of embodiments of reciprocating conveyors.

SUMMARY OF THE INVENTION

The subject invention is a drive system for reciprocating conveyors. Characteristically, such conveyors comprise a plurality of slats mounted on bearings with the slats close to and parallel to each other and movable longitudinally on the bearings. The bearings are mounted on structure which, for trucks and trailers, is attached to the frame of the truck/trailer. In operation with the conveyor carrying a load, when the slats are moved simultaneously a distance from a starting position in one direction, the load is moved by and with the slats for that distance. The slats are returned to the starting position without moving the load by moving less than one half of the slats at a time to the starting position. Accordingly, the function of a drive system for such conveyors is to move all the slats a fixed distance in one direction and to return the slats to the starting point in groups, one group at a time. The slats in the groups are evenly interspersed and the slats in each group are attached to a cross member called a cross drive, so that the slats in each group move in unison.

In the subject system there is a double acting linear hydraulic actuator for each group. The piston areas of the actuators are not the same. With two actuators the piston area of one actuator is two thirds that of the other, for example, and with three actuators the piston area of one actuator is three fourths that of the largest actuator and the piston area of the third actuator is one half that of the largest actuator, for example. A pump delivers hydraulic fluid through a control valve to the actuators from a reservoir and exhausted fluid is returned to the reservoir.

The actuators are connected in parallel and all the slats are subjected to essentially equal frictional restraint by the load of material being handled. The slats are actuated cyclically. At the start of the cycle the cross drives are in side to side contact ready for an active stroke: i.e. all the slats move in unison to move the load. In the starting condition the cross drive actuated by the actuator having the largest piston area cannot move unless the other cross drive(s) also move. Therefore, when hydraulic pressure is applied by the control valve for an active stroke all the cross drives and slats move in unison.

At the end of the active stroke the control valve is adjusted to cause the actuators, cross drives and slats to return to the start condition, completing the cycle. For the return stroke(s) each cross drive can move independently of the others. As hydraulic pressure rises the actuator with the largest piston area will be the first to develop enough force to move the slats it drives and that group of slats will be returned with hydraulic pressure holding essentially constant while that happens. When that action is completed the pressure will then increase until the actuator with the next smaller piston area develops enough force to move the group of slats it drives and that group will be moved with pressure holding essentially constant during the return stroke of that group of slats. The pressure then increases again until the actuator with the next smallest piston area also develops enough force to move the group of slats it drives and pressure holds essentially constant during the return stroke of that group of slats. When all the slats are returned the control valve is adjusted automatically to restart the cycle with an active stroke. The automatic adjustment of the control valve can be done mechanically, electrically or hydraulically, the choice being based on detailed considerations related to cost and reliability. In any case the adjustment is coordinated with the completion of strokes of the actuator having the smallest piston area and the cross drive to which it is attached. This is so because active and return strokes must not be initiated until that actuator has completed its stroke in each direction.

The system is turned on and off either by starting and stopping the pump or by use of an on/off valve between the pump and the control valve. In the second case a relief valve in the pump accommodates the fluid flow while the system is off.

The invention is described in more detail below with reference to the attached drawings.

DETAILED DESCRIPTION OF THE INVENTION

Figure 1:
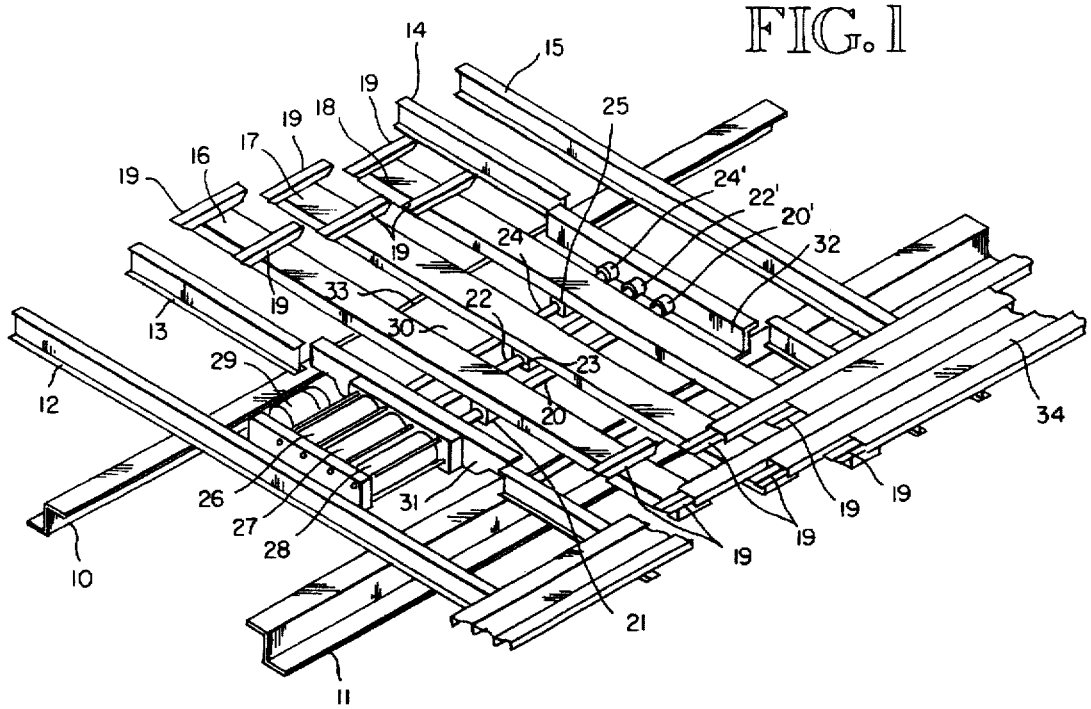
FIG. 1 is a mechanical/structural schematic illustration of the subject system.

The subject system is a drive system for reciprocating conveyors. FIG. 1 is a structural/mechanical schematic illustration of a reciprocating conveyor installed on the frame of a truck or trailer. Beams 10 and 11 are the primary longitudinal members of the vehicle frame. Beams 12, 13, 14 and 15 are typical cross members of the bed of the trailer supported on beams 10 and 11. Beams 16, 17 and 18 are cross members called cross drives and are parts of the subject system. The parts numbered 19 are shoes attached to and evenly spaced along the cross drives. In this illustration some shoes are omitted for clarity. Each cross drive is attached to the piston rod of a hydraulic actuator, rod 20 to cross drive 16 at 21, rod 22 to cross drive 17 at 23 and rod 24 to cross drive 18 at 25. The ends (not visible) of the piston rods are supported in bearings 20', 22' and 24'. Hydraulic actuators 26, 27 and 28 and control valve 29 are parts of an hydraulic assembly which also comprises a base 30 which further comprises end beams 31 and 32 and base plate 33. This assembly is supported by and attached to beams 10 and 11. Slats, slat 34 being typical, are attached to the shoes on the cross drives and are supported by the shoes and by bearings (not shown) attached to the cross members of the vehicle bed. In the complete assembly the slats cover the entire vehicle bed and are the floor of the cargo compartment of the vehicle.

The slats are movable longitudinally and are moved by the cross drives to which they are attached. They are operable in three groups in this embodiment, one for each cross drive and the shoes are positioned on the cross drives such that one slat from each group is included in each three adjacent slats.

As explained below, the subject drive system moves the slats in unison in one longitudinal direction and sequentially group by group in the other. Cargo supported on the slats is moved with the slats when they are moved in unison.

Figure 2:
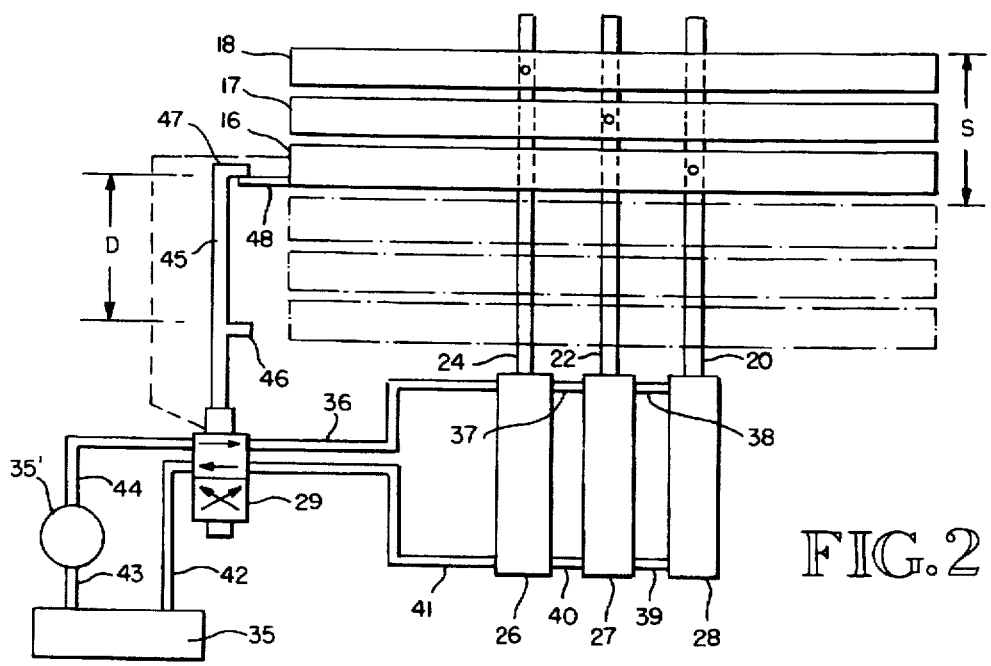
FIG. 2 is a hydraulic schematic illustration of the subject system.

FIG. 2 is a schematic illustration of the hydraulics of the subject system. Linear hydraulic actuators 26, 27 and 28 actuate cross drives 16, 17 and 18 respectively via piston rods 20, 22 and 24 respectively. The actuators have equal strokes but different piston areas as indicated by the difference in diameter of the actuators in the drawing. The actuators are powered by fluid pumped from reservoir 35 by pump 35' through control valve 29 and via lines 36, 37, 38, 39, 40, 41, 42, 43 and 44 and the actuators are connected in parallel. As shown in the diagram, the control valve is set so that the actuators are fully extended. Setting the valve in its other position causes the actuators to retract and they will retract in unison since actuator 26, having the largest piston area will be the first to develop enough force to move the slats it drives and cannot move until actuators 27 and 28 also develop enough force, assisted by the force from actuator 26 to move the slats attached to them. The retracted positions of the cross drives are shown by the phantom lines. Resetting the valve to the position shown will cause extension of the actuators and they will extend in sequence, actuator 26 first, actuator 27 after actuator 26 is fully extended and actuator 28 after actuator 27 is fully extended. This sequential extension is again the result of the difference in piston areas of the actuators. As hydraulic pressure increases actuator 26 will be the first to develop enough force to move, then actuator 27 and then actuator 28.

The dashed line indicates that the setting of the valve is controlled from the positioning of the cross drive connected to the actuator having the smallest piston area since the valve must not be set for action in unison until the sequential action is complete and the final action in the sequential action is provided by the actuator having the smallest piston area.

Actuation of the valve by the cross drive can be done mechanically, electrically or hydraulically using techniques well known in the art. Mechanical valve actuation is shown schematically by rod 45, stop 46 and 47 on the rod and extension 48 on cross drive 18. Distance D between the stops is shorter than actuator stroke S by a distance sufficient to reset the valve. On each stroke of the actuators, the valve is reset during the last increment of the stroke.

It is considered to be understandable from this description that the subject invention meets its objectives. It provides, for reciprocating conveyors, a drive system which is simpler than known prior art systems, comprising three hydraulic actuators and one two position four way valve. Because of this simplicity the system is less expensive to manufacture, operate and maintain than known prior art systems and also more reliable. It is readily usable in a wide variety of types of reciprocating conveyors.

It is also considered to be understood that while one embodiment of the subject invention is described herein, other embodiments and modifications of the one described are possible within the scope of the invention which is limited only by the attached claims. For example, actuation could be accomplished using rotary hydraulic or electromechanical actuators cooperating with racks or using ball screw actuators.

I claim:

1. A drive system for use in a reciprocating conveyor, said conveyor being installed on a structure and comprising a plurality of groups of slats and a plurality of drive members, said slats being longitudinally slidable on said structure, said slats in each group of said plurality of groups being attached to one of said drive members, one for each group, each of said drive members being activated by said drive system to move said slats in said plurality of groups in unison in a first longitudinal direction and sequentially in a second longitudinal direction, said drive system comprising an actuator for each of said groups, a first actuator having a first piston area, each of said remaining actuators progressively having a piston area which is a fraction of the piston area of the preceding actuator, said fraction being in a range of 0.5 to 0.95, one of said actuators having a smallest piston area, said actuators being hydraulically interconnected, said system further comprising a pump, a reservoir and a control valve, said pump providing hydraulic power to said actuators through said valve, said valve being operable to a first position to cause said actuators to move said drive members in said second direction, said system further comprising means for operating said valve such that said valve is operated to cause said actuators to move said drive members in said first direction when said smallest actuator has completed motion in said second direction and to cause said actuators to move said drive members in said second direction when said smallest actuator has completed motion in said first direction, said actuators and said drive members being arranged such that actuators and drive members can move only in unison in one of said directions and move independently and in sequence in the other of said directions.

\* \* \* \* \*